Sept. 17, 1940.    R. J. BUSH    2,215,346

BRAKE MECHANISM

Filed July 26, 1939

INVENTOR
RANKIN J. BUSH
BY
A. M. Higgins
ATTORNEY

Patented Sept. 17, 1940

2,215,346

UNITED STATES PATENT OFFICE 2,215,346

BRAKE MECHANISM

Rankin J. Bush, Jeanette, Pa., assignor to The Westinghouse Air Brake Company, Wilmerding, Pa., a corporation of Pennsylvania Application July 26, 1939, Serial No. 286,597

11 Claims. (Cl. 188—56)

This invention relates to brake mechanism for railway vehicle trucks and more particularly to brake mechanism of the type disclosed in an application of Carlton D. Stewart Serial No. 214,517, filed June 18, 1938, (Case 4480), in which there is employed clasp arranged brake elements operative into braking engagement with a braking surface which is rotatable with one of the wheel and axle assemblies of the truck, which clasp arranged brake elements and mechanism for actuating them are carried by a brake carrier which is mounted on the frame of the truck for vertical movement relative thereto, and which carries a third brake element for engagement with the braking surface upon movement of the carrier by the clasp arranged elements.

In the apparatus shown and described in the aforementioned Stewart application each brake carrier extends over the top of a braking surface on the wheel and axle assembly. In some railway vehicle construction, the clearance directly above the braking surface, especially when the braking surface is the track rail engaging surface of the tread portion of the wheel, may be so limited as to preclude the use of the carrier in this position, and with this in mind, the principal object of the invention is to provide a brake mechanism of the above type having the brake carrier so constructed and arranged as to require minimum clearance above the braking surface of the wheel and axle assembly, thereby eliminating the clearance difficulties hereinbefore mentioned.

Another object of the invention is to provide a brake mechanism of the above mentioned type having the brake carrier so constructed and arranged with relation to the wheel and axle assembly that it will require no more clearance above the braking surface of the assembly than that required by the brake element which it carries and which it is adapted to move into engagement with the braking surface.

Another object of the invention is to provide a novel brake mechanism of the above mentioned type which is especially adapted for frictional braking engagement with track rail engaging surface of the tread portion of one of the wheels of a wheel and axle assembly of the truck.

Other objects and advantages will appear in the following more detailed description of the invention.

Figure 1:
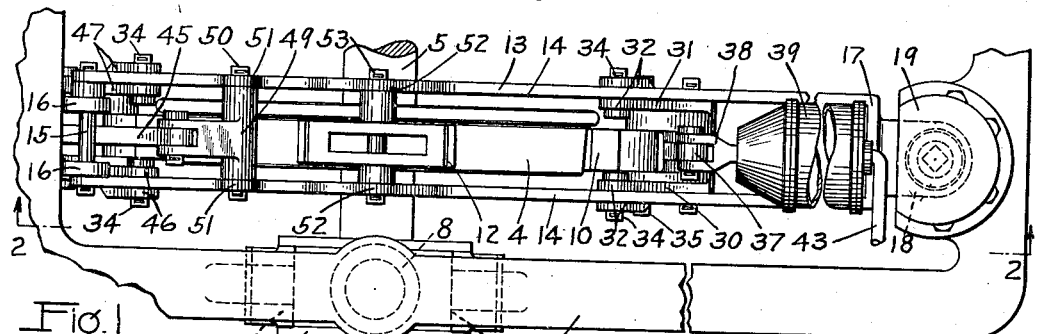
Figure 2:
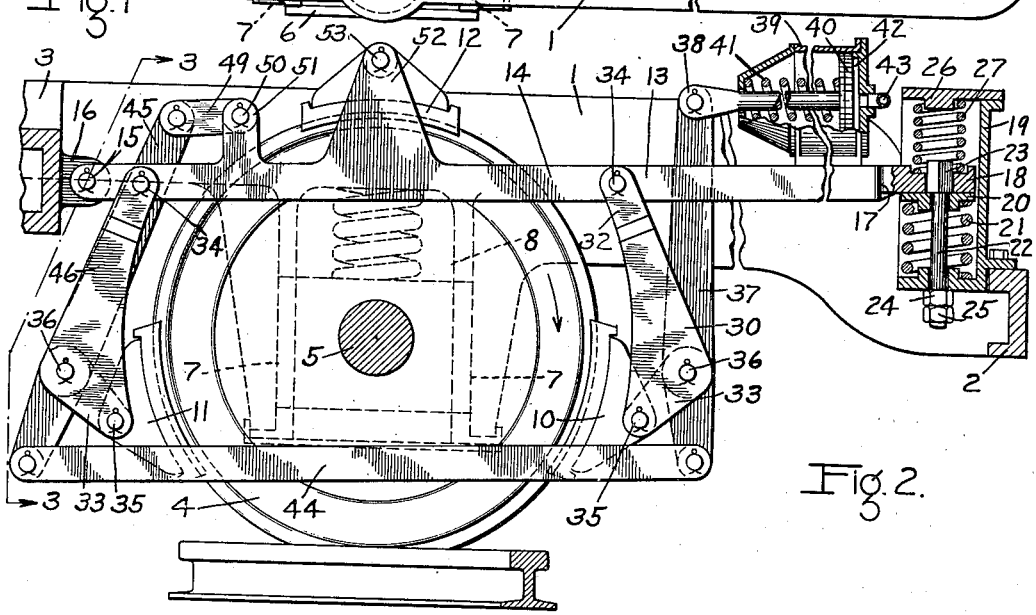
Figure 3:
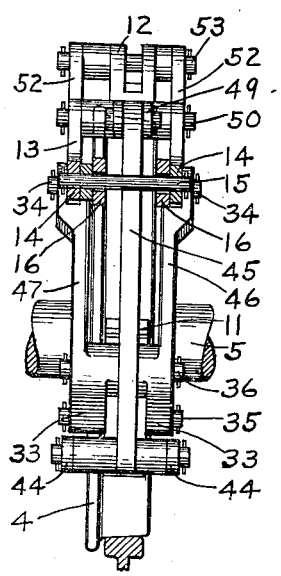

In the accompanying drawing Fig. 1 is a plan view of a portion of one end of a railway vehicle truck embodying the invention; Fig. 2 is a longitudinal sectional view taken on the line 2—2 of Fig. 1 to show the mechanism in side elevation, portions of the mechanism being broken away to more clearly illustrate certain details of construction; and Fig. 3 is a cross sectional view taken on the line 3—3 of Fig. 2, the truck frame being omitted.

For illustrative purposes only, the invention is shown in conjunction with a railway vehicle truck of the conventional type comprising a cast metal truck frame having laterally spaced longitudinally extending side pieces 1 which are integrally connected together at each end by an end piece 2 and are integrally connected intermediate their ends by the usual spaced parallel extending transoms 3; the truck also comprises a plurality of wheel and axle assemblies each of which comprises laterally spaced wheels 4 which are connected together transversely of the truck by an axle 5, which axle, at each side of the truck may be journaled in an axle box 6 mounted between the usual spaced pedestal jaws 7 depending from a side piece of the truck frame. The truck frame is movable vertically relative to the wheel and axle assembly and is resiliently carried by the wheel and axle assemblies through the medium of springs 8, each of which springs, in the present embodiment of the invention, rests on the upper surface of an axle box 6.

The brake mechanism may be complete for as many individual wheels of the truck as desired, and has been shown in conjunction with only one wheel of a wheel and axle assembly and the adjacent portions of one end of the truck frame, and for the sake of simplicity the following description will be more or less limited to what is shown.

The track engaging surface of the tread portion of the wheel 4 is adapted to be frictionally engaged by brake elements 10, 11 and 12 which are radially arranged about the wheel, the elements 10 and 11 being located at opposite sides of the wheel and the element 12 being located above the wheel. The greater portions of the elements 10 and 11 extend below the horizontal center line of the wheel while the element 12 is centered on substantially the vertical center line of the wheel. It will here be understood that each brake element may comprise the usual brake shoe and brake shoe head, but since this construction of head and shoe is so well known, each element will, for simplification, be hereinafter referred to as a brake shoe.

Located at the inner side of the side piece 1 of the truck frame and extending longitudinally thereof is a combined lever and brake carrier member 13 which, in the present embodiment of the invention, is of yoke form having laterally spaced parallel side pieces 14 arranged one on each side of the wheel 4 and below the top of the track engaging surface of the tread portion of the wheel. The inner ends of these side pieces 14 are pivotally connected, by means of a pin 15, to laterally spaced lugs 16 for vertical movement relative to the truck frame, which lugs extend outwardly from the transom 3 in a direction toward the wheel. At the outer ends of the member the side pieces are connected together by an end piece 17 having an outwardly extending lug 18 which extends into a hollow casing 19 secured to the end piece 2 of the truck frame. The under surface of this lug rests on a spring seat 20 which is supported by a release spring 21 seated on the bottom wall of the casing.

Extending through a central opening in the spring seat 20 and bottom wall of the casing is a bolt 22 having at its upper end a head 23 which is square in cross section and which is accommodated by a correspondingly shaped opening provided in the lug 18. The under side of the head of this bolt engages the spring seat, and since, as shown, the lower end of the bolt is provided with a nut 24 which engages the lower surface of the bottom wall of the casing, the head of the bolt will limit upward movement of the spring seat 20 relative to the truck frame. The nut is rotatable to effect any desired adjustment of the bolt vertically relative to the truck frame and this nut is held against accidental rotation on the bolt by means of a check nut 25.

Interposed between and operatively engaging the upper side of the lug 18 and the top wall 26 of the casing 19 is a spring 27 which is adapted to resist accidental upward movement of the outer end of the member 13 when the member is in its normal release position as best shown in Fig. 2. This spring 27 also serves to prevent the dead weight of the truck frame carried thereby from being transmitted to the member 13, when, with the brakes applied, the truck frame for any reason moves downwardly relative to the wheel and axle assembly.

At one side of the wheel there is provided laterally spaced hanger levers 30 and 31, which in the present embodiment of the invention are each of modified bell crank form having arms 32 and 33 which are disposed at an angle to each other, the upper end of the arm 32 of the lever 30 is pivotally hung from one of the side pieces 14 of the member 13 by means of a transversely extending pin 34, and the upper end of the corresponding arm of the lever 31 is pivotally connected in the same manner to the other side piece 14 of the member. The brake shoe 10 has a portion which extends between the lower ends of the arms 33 of the levers 30 and 31 and is pivotally supported from these arms by means of a transversely extending pin 35 which is mounted in the arms.

Also extending between the levers 30 and 31 and pivotally carried thereby through the medium of a transversely extending pin 36 is a live or brake cylinder lever 37, the pin 36 passing through the levers at a point intermediate their ends.

The upper end of the lever 37 is operatively connected to the outer end of a push rod 38 of a brake cylinder device 39 which is rigidly secured to the outer end portion of the member 13.

The brake cylinder device may be of the usual construction having a piston 40 which is operative to actuate the push rod 38, and having a release spring 41 interposed between and operatively engaging the piston and the non-pressure head of the brake cylinder casing. At one side of the piston is a pressure chamber 42 which is in communication with a flexible conduit 43 through which fluid under pressure may be admitted and released from the chamber 42 for controlling the operation of the brake cylinder piston.

The lower end of the brake cylinder lever is operatively connected to the adjacent ends of laterally spaced longitudinally extending connecting rods 44 which are arranged one at each end face of the wheel. The other ends of the bars 44 are operatively connected to the lower end of a dead lever 45 which is pivotally carried by laterally spaced hanger levers 46 and 47, which levers may be identical with the hanger levers 30 and 31 and which may be supported from the member 13 in the same manner. The levers 46 and 47 are operatively connected to the brake shoe 11 in the same manner as the levers 30 and 31 are connected to the brake shoe 10.

The upper end of the dead lever 45 is pivotally connected with one end of a longitudinally extending fulcrum link 49 which is pivotally connected at its other end, by means of a pin 50, to laterally spaced lugs 51 carried by and extending upwardly from the side pieces 14 of the member 13.

Also carried by the side pieces 14 and extending upwardly therefrom are laterally spaced lugs 52 which, at their upper ends have operatively connected thereto, by means of transversely extending pins 53, the brake shoe 12.

By interposing the hanger levers between the brake levers 37 and 45, such levers 37 and 45 are made shorter than would be possible if they were directly connected to the brake shoes. This makes it possible to mount the brake cylinder on the brake carrier 13 and to also locate the connecting bars 44 well above the track rails where they are not liable to be damaged.

With the brake cylinder device 39 devoid of fluid under pressure the brake rigging will be in release position as shown in the drawing and will be maintained in this position by the force of gravity or by a release spring when such a spring is employed. In this position the weight of the brake rigging which is transmitted to the outer end of the member 13 will be insufficient to compress the spring 21 and from this it will be apparent that when the brake rigging is in release position this spring will maintain the member in its normal position as shown.

*Application of the brakes*

When it is desired to effect an application of the brakes, fluid under pressure is admitted in the usual manner to the brake cylinder pressure chamber 42 by way of the flexible conduit 43. In response to the pressure of fluid thus admitted, the brake cylinder piston 40 functions to actuate the push rod 38 and thereby the brake cylinder levers 37 and hanger levers 30 and 31 and 46 and 47 to cause the brake shoes 10 and 11 to frictionally engage the track engaging surface of the tread portion of the wheel 4. With the brake shoes 10 and 11 in such engagement, the increasing force applied to the brake shoes through the operation of the brake cylinder device causes the shoes to move downwardly along the rail engaging surface of the wheel. This downward movement is due to the location of the shoes below the horizontal center line of the brake drum and to the application of the braking force to the shoes in a direction substantially parallel to the horizontal center line of the wheel and axle assembly. The downwardly directed force, due to such action being transmitted through the hanger levers 30, 31, 46 and 47 causes the member to move downwardly about the pin 15 and against the opposing action of the spring 21 until such time as the brake shoe 12 engages the wheel. At this time downward movement of the member 13 and the brake rigging will stop since the member will now be supported by both the truck frame and the wheel 4.

With the wheel and axle assembly rotating in the direction indicated by the arrow in Fig. 2, the drag of the wheel 4 on the brake shoe 10 at the front end of the truck will cause a further downwardly directed pull to be applied to the hanger levers 30 and 31 and thereby to the outer end portion of the associated member 13, thus augmenting the force applied to the brake shoe 12. The drag of the wheel on the brake shoe 11 at this end of the truck has a tendency to move the shoe upwardly, but this tendency is overbalanced by the downward force set up by shoes as they tend to move downwardly along the braking surface on the wheel under the influence of brake cylinder pressure applied to the lever 45. In other words, the force applied to the outer end portion of the member 13 through the medium of the hanger levers 30 and 31 is the sum of the downwardly directed force produced by the action of the shoe 10 under the influence of brake cylinder pressure and the force produced by the downward drag of the wheel on the shoe, while the force applied to the member 13 through the medium of the hangers 46 and 47 is that produced by the action of the shoe 11 under the influence of brake cylinder pressure minus the force due to the upward drag of the wheel on the shoe. From this it will be apparent that the downward pull of the brake shoe 10 at the leading side of the wheel will exceed the downward pull of the brake shoe at the other side of the wheel. At the other or rear end of the truck the downward pull of the brake shoes 10 and 11 on the member 13 is just the reverse of that of the shoes at the front end of the truck since the disposition of the shoes with respect to the leading and other side of the brake drum is the reverse of that at the front end.

It will here be noted that at the front end of the truck the greater pull of the brake shoe at the leading side of the wheel 4 is transmitted to the outer end of the member 13 while at the rear end of the truck the corresponding pull of the brake shoe at the leading side is applied to the member 13 intermediate its end. As a result the brake shoe 10 at the front end of the truck will be applied with greater force to the wheel than will the corresponding brake shoe at the rear end of the truck.

It will be evident that with the brakes applied the members 13 will tend to rotate with the wheel 4 so that the member at the front end of the truck will exert an upward force on its pivot pin 15 and the member at the rear end of the truck will exert a downward force on its pivot pin.

It will be seen that with the brake rigging in application position, the brake shoe 12, besides serving to assist in supporting the member 13 and thereby the brake rigging, also acts to resist rotary movement of the wheel and axle assembly, thus materially increasing the braking action on the assembly for any given brake applying force applied to the rigging.

When the vehicle is in motion and an application of the brakes is initiated, the momentum of the body of the vehicle has a tendency to tilt the truck forwardly with the result that the adhesion between the rear truck wheels and the track rails will be unintentionally increased so that these wheels will have a greater tendency to slide on the rails than will the front truck wheels.

With this in mind the brake arrangement disclosed in the drawing has been so designed that the total braking force of the three brake shoes on the rear wheels of the truck for a given brake cylinder pressure will be less than that of the corresponding brake shoes on the front wheels, thereby lessening the tendency of the rear wheels to slide on the rails.

*Release of the brakes*

When it is desired to release the brakes, fluid under pressure is vented from the brake cylinder chamber 42 by way of the flexible conduit 43 and when this is accomplished the usual release spring 41, in the brake cylinder device causes the brake cylinder piston 40 and push rod 38 to move inwardly to their normal release position. At the same time the force of gravity causes the brake shoes 10 and 11 and the several parts of the brake rigging associated therewith to assume their normal release positions as shown in the drawing. It will here be noted that as the brakes shoes 10 and 11 move out of contact with the wheel 4 the spring 22 acts to raise the outer end of the member 13, thereby moving the brake shoe 12 out of engagement with the wheel, the upward movement of the member being limited by the engagement of the spring seat 20 with the head 23 of the bolt 22 and the engagement of the adjusting nut 24 with the bottom wall of the casing 19.

Modifications in the structure illustrated and described may be made without departing from the spirit of my invention, and I do not therefore wish to be limited otherwise than by the scope of the appended claims.

Having now described my invention, what I claim as new and desire to secure by Letters Patent, is:

1. In a brake mechanism for a railway vehicle truck, in combination, a wheel and axle assembly having a braking surface, clasp arranged brake elements movable into braking engagement with said surface, braking means also movable into braking engagement with said surface, hanger levers for supporting said clasp arranged brake elements from said braking means and operable to actuate said elements, and operatively connected live and dead levers operative for actuating said hanger levers, said clasp arranged brake elements when in engagement with said surface acting through the medium of the hanger levers for actuating said braking means.

2. In a brake mechanism for a railway vehicle truck, in combination, a wheel and axle assembly having a braking surface, clasp arranged brake elements movable into braking engagement with said surface, hanger levers for actuating said clasp brake elements, braking means also movable into braking engagement with said surface, and operatively connected dead and live levers for actuating said hanger levers, said hanger levers being supported by said braking means and being operable by the clasp arranged brake elements for actuating the braking means.

3. In a brake mechanism for a railway vehicle truck, in combination, a wheel and axle assembly having a braking surface, clasp arranged brake elements movable into braking engagement with said surface, braking means also movable into braking engagement with said surface, hanger levers for supporting said clasp arranged brake elements from said braking means and operable to actuate said elements, and operatively connected live and dead levers carried by said hanger levers and operative for actuating the hanger levers, said clasp arranged brake elements when moved into engagement with said surface acting through the medium of the hanger levers for actuating said braking means.

4. In a brake mechanism for a railway vehicle truck, in combination, a wheel and axle assembly having a braking surface, clasp arranged brake elements movable into braking engagement with said surface, braking means also movable into braking engagement with said surface, hanger levers for supporting said clasp arranged brake elements from said braking means and operable to actuate said elements and operatively connected live and dead levers carried by said hanger levers and operative for actuating said hanger levers, said clasp arranged brake elements when moved into engagement with said surface acting through the medium of said hanger levers for actuating said braking means, and said dead lever being adjustably fulcrumed to said braking means to permit free relative vertical movement between the lever and braking means.

5. The combination with a railway vehicle truck comprising a wheel and axle assembly and a truck frame supported by said assembly, of brake means movable into braking engagement with said assembly, said braking means comprising two brake shoes disposed in clasp arrangement about said wheel and axle assembly and movable into braking engagement with the assembly, a hanger lever supporting each of the clasp arranged brake shoes and operable to actuate said shoe, operatively connected levers carried by the hanger levers and operative to actuate the hanger levers, another brake shoe movable into engagement with said assembly, and means for actuating said other brake shoe, said means being adapted to support said hanger levers and being operable by the hanger levers to move said other brake shoe into braking engagement with said assembly.

6. The combination with a railway vehicle truck comprising a wheel and axle assembly and a truck frame supported by said assembly, of braking means movable into braking engagement with said assembly, said braking means comprising two brake shoes disposed in clasp arrangement about said wheel and axle assembly and movable into braking engagement with the assembly, a hanger lever supporting each of the said shoes and operable to actuate the shoe, operatively connected dead and live levers carried by the hanger levers and operative to actuate the hanger levers, another brake shoe movable into engagement with said assembly, means for actuating said other brake shoe, said means being adapted to support said hanger levers and being operable by the hanger levers to move said other brake shoe into braking engagement with said assembly, and a brake cylinder device carried by said means operative to actuate said live lever.

7. The combination with a railway vehicle truck comprising a truck frame and a supporting wheel and axle assembly, of a clasp brake mechanism operative into braking engagement with the track rail engaging surface of one of the wheels of said assembly, said brake mechanism being movable downwardly relative to the truck frame when in engagement with said surface in response to the forces set up due to the braking action between said mechanism and surface, a support member for said clasp brake mechanism located below the top of said surface and movable downwardly relative to the truck frame by the clasp brake mechanism when the clasp brake mechanism moves downwardly, a combined brake and support element adapted to be moved by said support member into contact with the top of said surface, and means for operatively connecting said element and support member.

8. The combination with a railway vehicle truck comprising a truck frame and a supporting wheel and axle assembly, of a clasp brake mechanism operative into braking engagement with the track rail engaging surface of one of the wheels of said assembly, said brake mechanism being moved downwardly relative to the truck frame when in engagement with said surface in response to the forces set up due to the braking action between the mechanism and surface, a support member for said clasp brake mechanism located below the top of said surface and movable downwardly relative to the truck frame by the clasp brake mechanism when the clasp brake mechanism moves downwardly, a combined brake and support element adapted to be moved by said support member into contact with the top of said surface, and means carried by and extending upwardly from said support member operatively connected to said element.

9. The combination with a railway vehicle truck comprising a truck frame and a supporting wheel and axle assembly, of a clasp brake mechanism operative into braking engagement with the track rail engaging surface of one of the wheels of said assembly, said brake mechanism being movable downwardly relative to the truck frame when in engagement with said surface in response to the forces set up due to the braking action between said mechanism and surface, a support member for said clasp brake mechanism located below the top of said surface, and movable downwardly relative to the truck frame by the clasp brake mechanism when the clasp brake mechanism moves downwardly a combined brake and support element adapted to be moved by said support member into contact with the top of said surface, and a lug carried by and extending upwardly from said support member, and means operatively connecting said element to said lug.

10. The combination with a railway vehicle truck comprising a truck frame and a supporting wheel and axle assembly, having a braking surface, a clasp brake mechanism operative into braking engagement with said surface, said brake mechanism being movable downwardly when in braking engagement with the surface in response to the forces set up due to the braking action between the mechanism and surface, a support member for said clasp brake mechanism carried by said truck frame and movable downwardly relative to the truck frame by the clasp brake mechanism when the mechanism moves downwardly and means movable by said support member into engagement with said surface, said support member being located below said means and having an upwardly extending projection operatively connected to said means.

11. The combination with a railway vehicle truck comprising a truck frame and a supporting wheel and axle assembly, having a braking surface, a clasp brake mechanism operative into braking engagement with said surface, said brake mechanism being movable downwardly when in braking engagement with the surface in response to the forces set due to the braking action between the mechanism and surface, a support structure for said clasp brake mechanism carried by said truck frame and movable downwardly relative to the truck frame by the clasp brake mechanism when the mechanism moves downwardly, and means movable by said support structure into engagement with said surface, said support structure comprising a pair of longitudinally extending laterally spaced side pieces located below said means and arranged one at each side of the wheel and having upwardly extending projections operatively connected to said means.

RANKIN J. BUSH.